United States Patent
Cheung et al.

[11] Patent Number: 5,454,391
[45] Date of Patent: Oct. 3, 1995

[54] DEVICE FOR CLEANING CART WHEELS

[76] Inventors: Charles Cheung, 3628 Keswick Way, Sacramento, Calif. 95826; Carlos E. Mosto, 749 Harding Blvd., Roseville, Calif. 95678

[21] Appl. No.: 295,604

[22] Filed: Aug. 25, 1994

[51] Int. Cl.⁶ .................. B60S 3/00; B08B 3/04
[52] U.S. Cl. ........................... 134/123; 134/156
[58] Field of Search .............. 134/45, 123, 156, 134/185, 187; 15/53.4

[56]  References Cited

U.S. PATENT DOCUMENTS

| | | | |
|---|---|---|---|
| 1,694,197 | 12/1928 | Woodling | 134/45 |
| 2,989,965 | 6/1961 | Rod | 134/156 X |
| 3,444,867 | 5/1969 | Thornton | 134/123 |
| 4,279,263 | 7/1981 | Pulliam | 134/123 X |
| 4,841,591 | 6/1989 | Candow | 15/53.4 X |
| 4,917,125 | 4/1990 | Midkiff | 134/123 |
| 4,979,536 | 12/1990 | Midkiff | 134/123 |
| 5,261,433 | 11/1993 | Smith | 134/123 |

FOREIGN PATENT DOCUMENTS 1618686  1/1991  U.S.S.R. .................. 134/45

*Primary Examiner*—Philip R. Coe
*Attorney, Agent, or Firm*—Bielen, Peterson & Lampe

[57]  ABSTRACT

A device for cleaning cart wheels utilizing a trough of liquid which is intended for contacting the cart wheels. The trough includes a bottom portion supported on a ground surface and an upwardly extending side portion terminating in an edge. A floating platform is locatable in the trough and includes a multiplicity of openings through the same. The platform is capable of contacting a cart wheel and in certain cases buoying the cart itself. A first ramp member leads from the ground surface to the edge of the trough while a second ramp member leads from the trough edge and into contact with the floating platform.

5 Claims, 1 Drawing Sheet

DEVICE FOR CLEANING CART WHEELS

BACKGROUND OF THE INVENTION

The present invention relates to a novel device for cleaning cart wheels.

Carts such as those used to transport golf clubs, groceries, toddlers, and the like often become mired in mud or are otherwise soiled by dust and vegetation, such as grass clippings. In the past, users of the same have found it necessary to handwash the cart wheels with a cleaning implement such as a sponge or brush or simply hosing the same with a water string passing through a hose nozzle. Prior methods for cleaning cart wheels, although adequate, are generally deemed to be messy, inconvenient, and labor intensive.

A device for cleaning cart wheels which is easy to use and does not dirty the person cleaning the cart wheels would be a notable advance in the sports field and transportation.

SUMMARY OF THE INVENTION

In accordance with the present invention a novel and useful device for cleaning cart wheels is herein provided.

The device of the present invention utilizes a trough of liquid which is capable of contacting at least one of the cart wheels. The trough possesses a bottom portion which lies on a ground surface and an upwardly extending side portion terminating in an edge. The cleaning liquid in the trough may be water, soap and water, alcohol, or any known cleaning compositions.

A floating platform is also deemed to part of the present invention. The floating platform is locatable in the trough and includes a multiplicity of openings therethrough. In certain cases, the floating platform may take the form of a grate which possesses sufficient buoyant force to float to the surface of the liquid, and in certain cases to at least partially float the cart having the cart wheels.

A first ramp member is further utilized in the present invention. The ramp member leads from the ground surface surrounding the trough to the edge of the trough. The first ramp member may be formed of grate type material similar to the floating platform.

A second ramp member leads from the trough edge and into contact with the floating platform. The end of the second ramp may slidingly engage the trough platform. First and second ramp members may be hingedly attached to each other and either of the same may include a recess to engage the edge of the trough. In this way, carts which are wheeled up the first ramp over the edge of the trough and into the trough floating platform via the second ramp will not dislodge the first and second ramp members. Once in the trough, the cart wheel may be rolled back and forth on the platform. The natural upward force of the buoyant platform tends to tip the floating platform and create a suction force which pulls grass through the openings in the floating platform along with mud and other undesirable components.

It may be apparent that a novel and useful device for cleaning cart wheels has herein been described.

It is therefore an object of the present invention to provide a device for cleaning cart wheels which is simple and easy to use and does not require touching of the dirty cart wheels by the user.

Another object of the present invention is to provide a device for cleaning cart wheels which contains no motorized components and includes a floating platform having openings that create a sucking force when tipped to remove components such as grass clippings from the wheels of the cart.

Yet another object of the present invention is to provide a device for cleaning cart wheels which may be assembled and used in a facility such as a golf course without obstructing traffic through such area.

The invention possesses other objects and advantages especially as concerns particular characteristics and features thereof which will become apparent as the specification continues.

Figure 2:
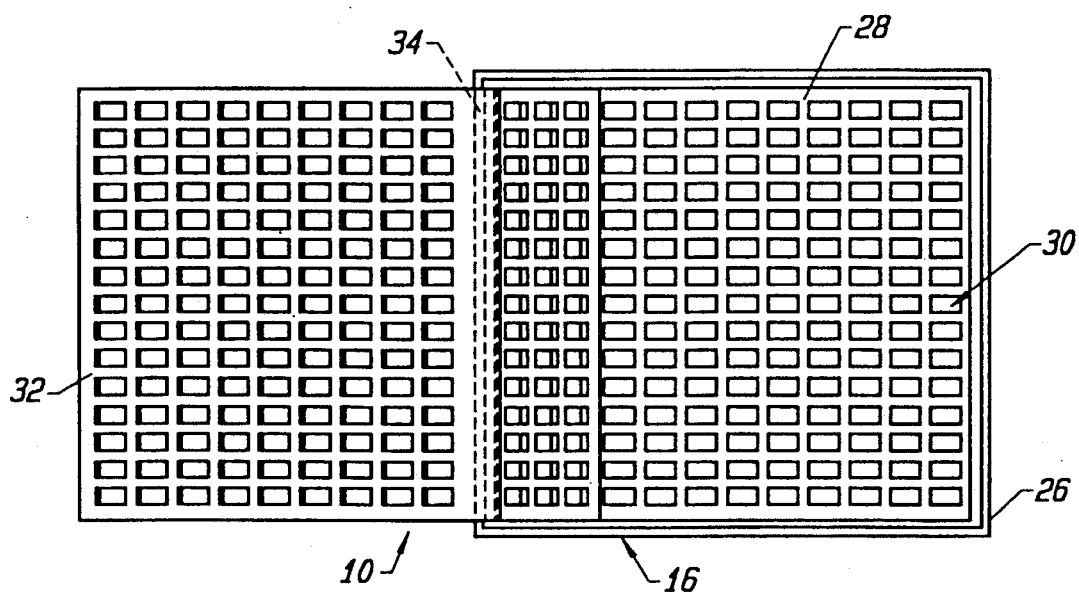
FIG. 2 is a top plan view of the device of the present invention in place.

For a better understanding of the invention reference is made to following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof which should referenced to the prior described drawings.

The invention as a whole is shown in the drawings by reference character 10. Device 10 is employed for cleaning cart wheels such as wheels associated with a golf cart 14 depicted in part on FIG. 1. It should be understood that golf cart 14 is merely an exemplar cart and that device 10 of the present invention may be employed with various types of carts such as shopping carts, strollers, and the like.

Device 10 includes as one of its elements a trough 16 which is filled with liquid 18 which may be water, water with a surfactant, cleaning solution, and the like. Trough 16 possesses a bottom portion 20 which rests on ground surface 22, side portion 24 extends upwardly from bottom portion 20 and terminates in an edge 26 which extends around the top of trough 16.

Floating platform 28 is formed of a mesh material having a multiplicity of openings 30 therethrough. Platform 28 is sized and composed of material which permits the same to float and in certain cases to impart buoyant force on golf cart 14. It should be noted that the wheel 12 of golf cart 14 when resting on platform 28 may be at least half way submerged within liquid body 18.

First ramp member 32 extends from edge 26 of trough 16 and allows golf cart 14 to travel upwardly from ground surface 22 to edge 26 of trough 16. Recess 34 extending along ramp member 32 holds the same to edge 26 of trough 16. First ramp member 32 may constructed of grate-type material similar to the construction of platform 28.

Figure 1:
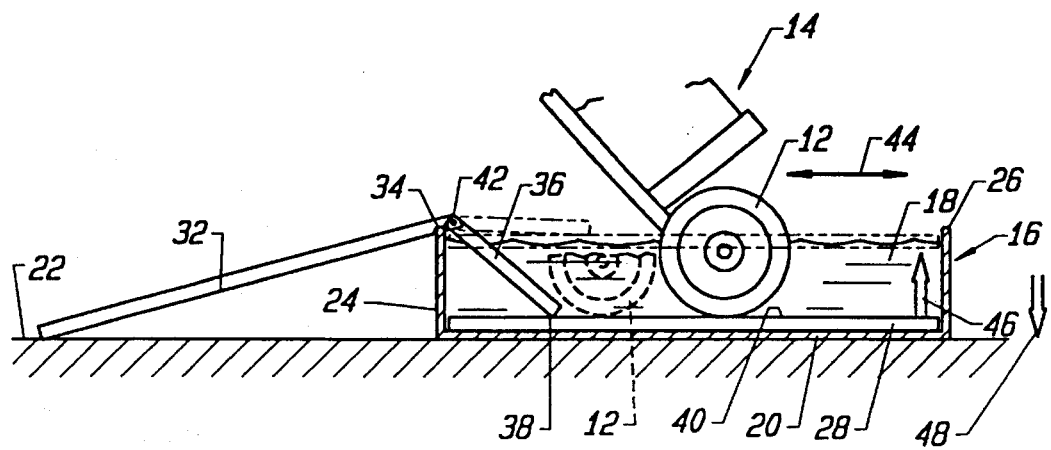
FIG. 1 is a side elevational view of the device of the present invention in use with a golf cart, the trough portion being shown in sections.

A second ramp member 36 extends from edge 26 to the top of platform 28. Corner 38 along second ramp member 36 slidingly engages the top surface 40 of floating platform 28. As depicted in FIG. 1, first ramp member 32 is hingedly attached to second ramp member 36 at hinge member 42. It should be noted that recess 34 may be formed in second ramp member 36 instead of first ramp member 32 as depicted in FIG. 1.

In operation, the user wheels golf cart 14 up ramp 32 from ground surface 22, onto ramp 36 and on to the top surface 40 of floating platform 28. Second ramp member 36 would rotate as necessary to achieve this result such that corner 38 slides on top surface 40 of floating platform 28. Golf cart 40 and cart wheel 12 are then wheeled back and forth according to directional arrow 44. Simultaneously, the portion of floating platform 28 not contacted by cart wheel 12 is permitted to tip upwardly in body of liquid 18 due to the buoyant force of the same according to directional arrow 46. Wheel 12 is depicted in phantom on FIG. 1 in this regard. Such motion creates a sucking action through the openings 30 of platform 28. Such sucking action pulls grass clippings and other debris through openings 30 of platform 28 and forces the same to the bottom 20 of trough 16. Golf cart 14 and cart wheel 12 may be moved to the right on FIG. 1 to force floating platform 28 downwardly, according to directional arrow 48, to permit tipping upwardly of platform 28 in the vicinity of second ramp member 36. Ramp member 36 will rotate to allow such tipping. It has been found that repeated movement of golf cart according to directional arrow 44 and the upward tipping of platform 28 according to directional arrow 46 successfully cleans golf cart wheels quickly and easily. Golf cart 12 is then removed from trough 16 via second ramp member 36 and first ramp member 32 for use.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A device for a cleaning cart wheel comprising:
   a. a trough of liquid for contacting the cart wheel, said trough including a bottom portion lying on a ground surface and an upwardly extending side portion terminating in an edge;
   b. a floating platform locatable in said trough, said floating platform including a multiplicity of openings therethrough, said floating platform being capable of contacting a cart wheel;
   c. a first ramp member, said first ramp leading from the ground surface to the edge of said trough; and
   d. a second ramp member leading from said edge of said trough into contact with said floating platform.

2. The device of claim 1 in which said first ramp member is hingedly attached to said second ramp member.

3. The device of claim 2 in which said first and second ramp members selectively includes a recess for engaging said edge of said trough.

4. The device of claim 1 in which said second ramp member slidingly engages said floating platform.

5. The device of claim 1 in which said floating platform is sized to move toward the surface of the liquid when the cart wheel moves along said floating platform.

* * * * *